(12) United States Patent
Oida et al.

(10) Patent No.: US 9,037,855 B2
(45) Date of Patent: May 19, 2015

(54) METHOD FOR REPRODUCING CONTENT DATA AND METHOD FOR GENERATING THUMBNAIL IMAGE

(71) Applicant: PANASONIC CORPORATION, Osaka (JP)

(72) Inventors: Atsushi Oida, Kanagawa (JP); Wataru Tachibana, Osaka (JP); Hiroyuki Wada, Kyoto (JP)

(73) Assignee: SOCIONEXT Inc., Kanagawa (JP)

( * ) Notice: Subject to any disclaimer, the term of this patent is extended or adjusted under 35 U.S.C. 154(b) by 64 days.

(21) Appl. No.: 14/073,474

(22) Filed: Nov. 6, 2013

(65) Prior Publication Data

US 2014/0068253 A1   Mar. 6, 2014

Related U.S. Application Data

(63) Continuation of application No. PCT/JP2012/002925, filed on Apr. 27, 2012.

(30) Foreign Application Priority Data

Jun. 6, 2011   (JP) .................................. 2011-126253

(51) Int. Cl.
*H04L 9/00*     (2006.01)
*G06F 21/60*    (2013.01)
*G06F 21/10*    (2013.01)
*G11B 20/00*    (2006.01)
(Continued)

(52) U.S. Cl.
CPC .............. *G06F 21/602* (2013.01); *G06F 21/10* (2013.01); *G11B 20/0021* (2013.01); *G11B 20/00086* (2013.01); *H04N 21/42623* (2013.01); *G11B 2020/1062* (2013.01); *G11B 2020/1075* (2013.01); *H04N 21/4435* (2013.01)

(58) Field of Classification Search
CPC .................. G06F 21/602; G06F 21/10; G11B 2020/1062; G11B 2020/1075; G11B 20/0021; H04N 21/4435; H04N 21/2541
See application file for complete search history.

(56) References Cited

U.S. PATENT DOCUMENTS 6,981,140 B1 *  12/2005  Choo ............................. 713/164
7,478,101 B1 *   1/2009  Manley ................................ 1/1
(Continued)

FOREIGN PATENT DOCUMENTS

JP       2009-194559 A      8/2009
WO       WO 02/19592    *   3/2002

OTHER PUBLICATIONS

International Search Report for International Application No. PCT/JP2012/002925 mailed Jul. 17, 2012, with English translation, 5 pgs.

*Primary Examiner* — Taghi Arani
*Assistant Examiner* — Sharon Lynch
(74) *Attorney, Agent, or Firm* — McDermott Will & Emery LLP

(57) ABSTRACT

A content data reproducing method includes: decrypting encrypted data to generate plain-text data; dividing the plain-text data into decrypted content data and reproduction management information; sending the reproduction management information to a user space; storing the decrypted content data in a secret buffer; obtaining the decrypted content data as reproduction target data from the secret buffer and transmitting the reproduction target data to a decoder; and decoding the reproduction target data by the decoder.

7 Claims, 13 Drawing Sheets

(51) Int. Cl.
*H04N 21/426* (2011.01)
*H04N 21/443* (2011.01)
*G11B 20/10* (2006.01)

(56) References Cited

U.S. PATENT DOCUMENTS

| | | | |
|---|---|---|---|
| 7,634,661 B2* | 12/2009 | England et al. | 713/176 |
| 7,734,844 B2* | 6/2010 | Pedersen et al. | 710/36 |
| 8,126,810 B2* | 2/2012 | Shen et al. | 705/51 |
| 8,285,987 B1* | 10/2012 | Kimball et al. | 713/164 |
| 8,335,916 B2* | 12/2012 | Brabson et al. | 713/151 |
| 2003/0182571 A1 | 9/2003 | Hashimoto et al. | |
| 2004/0123103 A1* | 6/2004 | Risan et al. | 713/164 |
| 2006/0013080 A1 | 1/2006 | Shibata | |
| 2007/0028067 A1 | 2/2007 | Hinrichs et al. | |
| 2008/0130885 A1* | 6/2008 | Yamamoto et al. | 380/201 |
| 2008/0250216 A1 | 10/2008 | Kershaw et al. | |
| 2009/0064048 A1* | 3/2009 | Bhattacharya | 715/838 |
| 2009/0083520 A1 | 3/2009 | Kanemura | |
| 2009/0292825 A1* | 11/2009 | Rosu et al. | 709/250 |
| 2009/0293117 A1* | 11/2009 | Yan et al. | 726/18 |
| 2010/0017893 A1* | 1/2010 | Foley et al. | 726/34 |
| 2010/0050241 A1* | 2/2010 | Yan et al. | 726/5 |
| 2010/0061378 A1* | 3/2010 | Joyner et al. | 370/395.53 |
| 2010/0169667 A1 | 7/2010 | Dewan | |
| 2010/0299759 A1* | 11/2010 | Kim et al. | 726/28 |
| 2010/0306540 A1 | 12/2010 | Yamada et al. | |

* cited by examiner

METHOD FOR REPRODUCING CONTENT DATA AND METHOD FOR GENERATING THUMBNAIL IMAGE

CROSS-REFERENCE TO RELATED APPLICATIONS

This is a continuation of International Application No. PCT/JP2012/002925 filed on Apr. 27, 2012, which claims priority to Japanese Patent Application No. 2011-126253 filed on Jun. 6, 2011. The entire disclosures of these applications are incorporated by reference herein.

BACKGROUND

The present disclosure relates to methods for reproducing content data, and specifically to a technique to reproduce encrypted content data.

In recent years, with growing need for copyright protection of content data such as video image data, content data provided with key and right information has been broadcast and distributed in terrestrial digital broadcasting, the Internet, etc. Consequently, the number of reproducing devices capable of handling content data protected by copyright has been increased, and demands for recording secure information on storage media have been increased. In a storage medium provided with a copyright protection function, mechanisms such as mutual authentication of a reproducing device and the storage medium, setting of a decryption key in an authentication area of the storage medium, and retention of right information are implemented.

In general, when content data encrypted for copyright protection is reproduced, it is often the case that decrypted plain-text content data is saved in a buffer for the purpose of, for example, smoothly performing a reproduction process. That is, in practice, the eventual security level of content data depends on products such as reproducing devices having buffers.

Conventionally, when a packet included in encrypted content data input from a network meets conditions preset in an input filter of a secure multimedia packet, a kernel level cryptographic module is invoked directly from the input filter to perform a decryption process on the encrypted content data (for example, see Japanese Unexamined Patent Publication No. 2009-194559). Then, plain-text content data generated by the decryption process is transmitted via a socket to a secure multimedia application in a user space.

SUMMARY

However, although storing the plain-text content data in the user space is not appropriate in terms of copyright protection, the technique described in Japanese Unexamined Patent Publication No. 2009-194559 does not consider the risk posed by storing the plain-text content data in the user space.

In recent years, the number of embedded devices designed as open platforms has been increased, but in many cases a platform serving as a base of such devices does not include a control module related to copyright protection. Moreover, since malicious applications are easily installed on, for example, smartphones adopting the open platform, storing the plain-text content data in a memory map in the user space freely accessible by the applications is a problem in terms of confidentiality.

Thus, according to the present disclosure, it is possible to reproduce encrypted content data while the confidentiality of the encrypted content data is kept at a high level.

An example method for reproducing encrypted content data includes: a decryption step of decrypting the encrypted content data to generate plain-text data; a division step of dividing the plain-text data generated in the decryption step into decrypted content data and reproduction management information including header information about the decrypted content data; a sending-to-user-space step of sending the reproduction management information obtained in the division step to a user space accessible by an application; a storing-in-kernel-space step of storing the decrypted content data obtained in the division step in a secret buffer in a kernel space of an operating system; a transmission-to-decoder step of obtaining the decrypted content data identified by the header information included in the reproduction management information as reproduction target data from the secret buffer when a decode request of the decrypted content data is made based on the reproduction management information, and transmitting the reproduction target data to a decoder; and a decode step of decoding the reproduction target data by the decoder.

With this method, the decrypted content data of the plain-text data is stored in the secret buffer in the kernel space, and the reproduction management information of the plain-text data is stored in the user space. Thus, information accessible by applications is limited to the reproduction management information. In other words, since access from applications to the decrypted content data stored in the kernel space is limited, the confidentiality of the decrypted content data, and thus of the encrypted content data is kept at a high level. Moreover, in the case of reproduction of decrypted content data, the decrypted content data stored in the secret buffer which is to be reproduced can be identified based on the reproduction management information including the header information about the decrypted content data. Thus, it is possible to reproduce the identified decrypted content data.

The above-described method for reproducing content data may further include: a pseudo data generation step of generating pseudo data corresponding to the decrypted content data obtained in the division step. In this case, in the sending-to-user-space step, the pseudo data generated in the pseudo data generation step is sent to the user space together with the reproduction management information obtained in the division step, and in the transmission-to-decoder step, the reproduction target data is identified by the pseudo data instead of header information included in the reproduction management information, and is obtained from the secret buffer.

Moreover, in the above-described method for reproducing content data, the encrypted content data may be data input from a storage medium, and the method may further include: before the division step, a plain-text data storing step of storing the plain-text data generated in the decryption step in the secret buffer; a thumbnail image generation step of generating a thumbnail image by extracting a part of video image data included in the plain-text data stored in the secret buffer; and a thumbnail image storing step of writing the thumbnail image to the storage medium with a file name of the thumbnail image being linked to a file name of the video image data.

Alternatively, a method for generating a thumbnail image from encrypted content data stored in a storage medium includes: a decryption step of decrypting the encrypted content data to generate plain-text data including video image data; a plain-text data storing step of storing the plain-text data generated in the decryption step in a secret buffer in kernel space of an operating system; a thumbnail image generation step of generating a thumbnail image by extracting a part of the video image data from the plain-text data stored in the secret buffer; and a thumbnail image storing step of writing the thumbnail image to the storage medium with a file name of the thumbnail image being linked to a file name of the video image data.

DETAILED DESCRIPTION

First Embodiment

Figure 1:
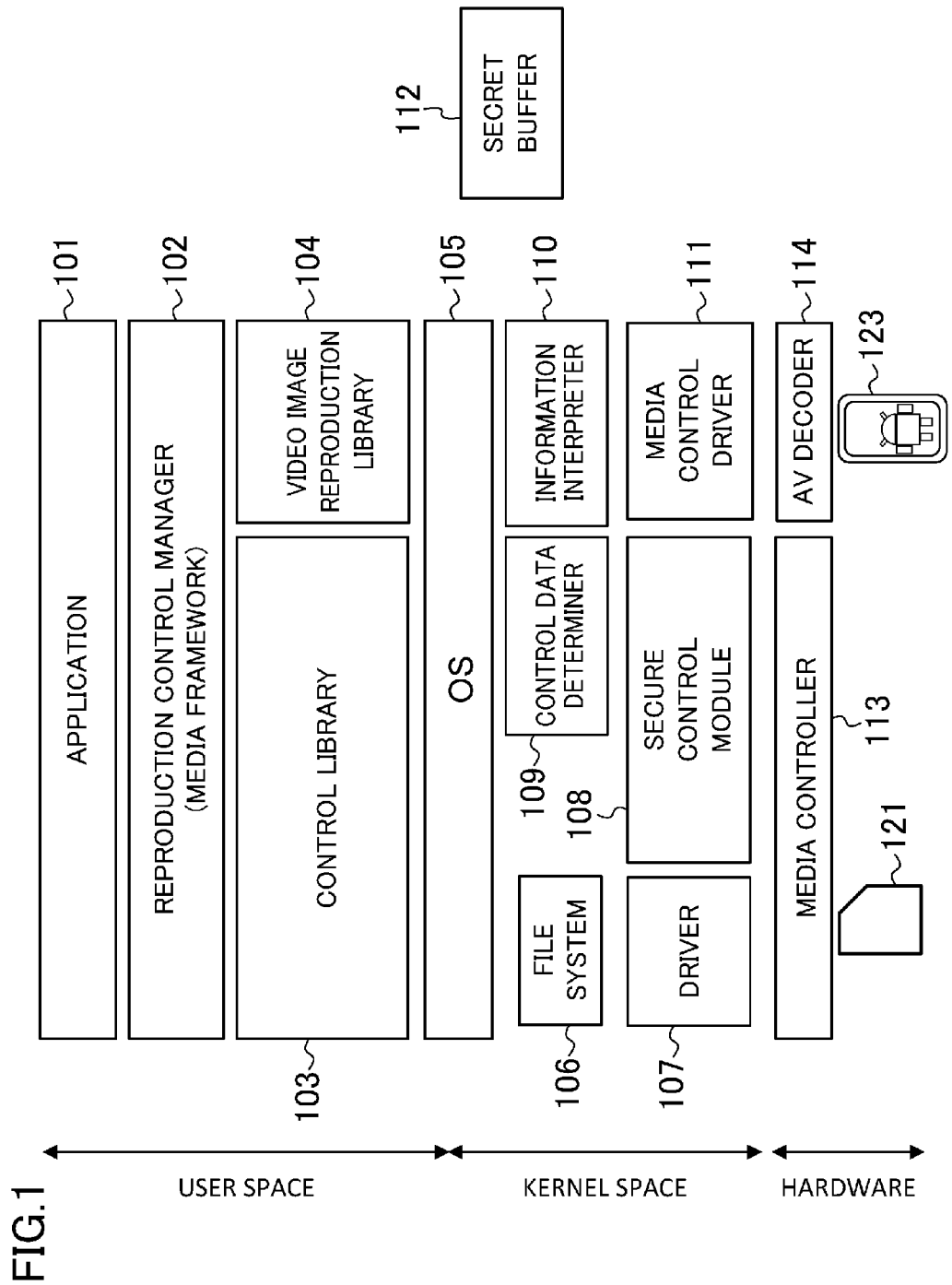
FIG. 1 is a block diagram illustrating a configuration of a content reproducing system according to a first embodiment.

FIG. 1 is a block diagram illustrating a configuration of a content reproducing system according to a first embodiment. The content reproducing system is, for example, a system designed as an open platform, and includes software and hardware. The software includes software in a user space and software in a kernel space. Moreover, as an operating system (hereinafter referred to as an OS) of the open platform, for example, Linux is installed.

The software in the user space includes an application 101, a reproduction control manager 102 configured to perform reproduction control management, special reproduction management, etc. of content data, a control library 103 configured to analyze headers in various formats according to the specification of a storage medium 121 such as a secure digital (SD) card, and a video image reproducing library 104.

The software in the kernel space includes a file system 106 constructed in a normal area, a driver 107 of the storage medium 121, a secure control module 108, a control data determiner 109, an information interpreter 110, and a media control driver 111. Here, the normal area means an area in a memory region in which authentication is not required in inputting/outputting data.

A secret buffer 112 is a memory space ensured in the kernel space of an OS 105, and is inaccessible from the user space. The secret buffer 112 has to have a size equal to the size of content data transferred at a time. In general, the kernel space and the user space are separated from each other in an address space, which limits access of software to the kernel space from the user space. However, a system call such as mmap from the user space may allow the access to the kernel space. Therefore, the secret buffer 112 is preferably provided in a part of the address space to which software is inaccessible even when a system call is made.

A media controller 113 is hardware configured to perform write and read processes and an authentication process on the storage medium 121 such as an SD card, and a decryption process of content data in the storage medium 121. An audio video (AV) decoder 114 is hardware configured to perform AV decoding.

Figure 2:
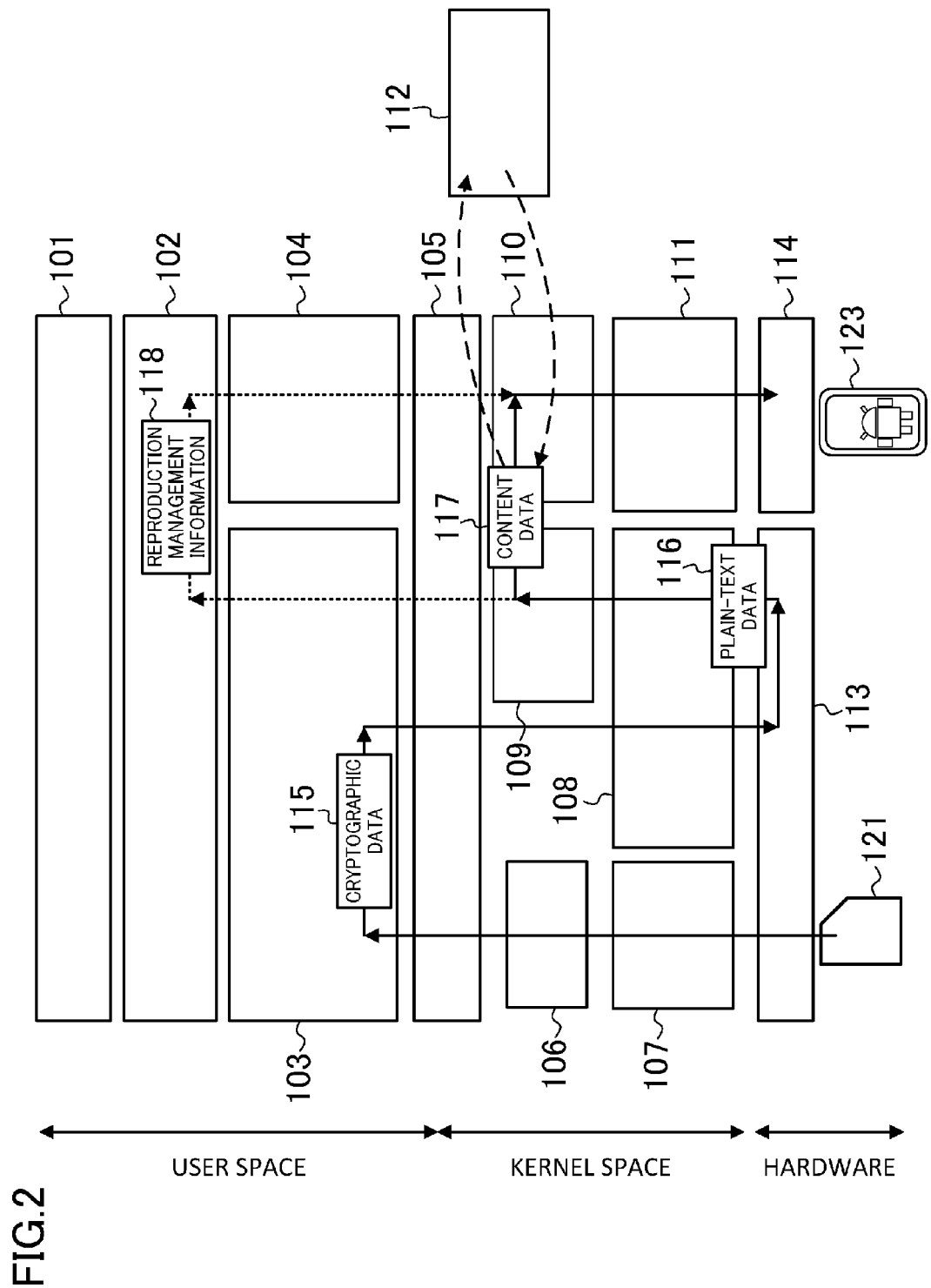
FIG. 2 is a view illustrating the data flow in the content reproducing system according to the first embodiment.

FIG. 2 is a view illustrating the data flow according to the present embodiment. Note that common reference numbers are used in FIGS. 1 and 2 to designate elements having substantially the same functions.

The control library 103 analyzes header information included in cryptographic data (encrypted content data) 115 obtained from the storage medium 121 via the file system 106 and the driver 107. Then, the control library 103 inputs the cryptographic data 115 to the media controller 113 in which a decryption key has been set. In this way, the cryptographic data 115 is converted to plain-text data 116.

The control data determiner 109 divides the plain-text data 116 into content data (decrypted content data) 117 and reproduction management information 118 including the header information such as the reproduction position and the sample size of the content data 117. The content data 117 is input to the secret buffer 112, and the reproduction management information 118 is input to the reproduction control manager 102.

When the reproduction control manager 102 makes an AV decode request based on the reproduction management information 118, the information interpreter 110 obtains, from the secret buffer 112, the content data corresponding to conditions such as the data size and the data offset included in the header information included in the reproduction management information 118. A search for the content data corresponding to the conditions may be sequentially performed, for example, from the top address or the last address of the secret buffer 112. Then, the obtained content data, which is reproduction target data, is input to the AV decoder 114 to be reproduced by a reproducing device 123 such as a smartphone.

Figure 3:
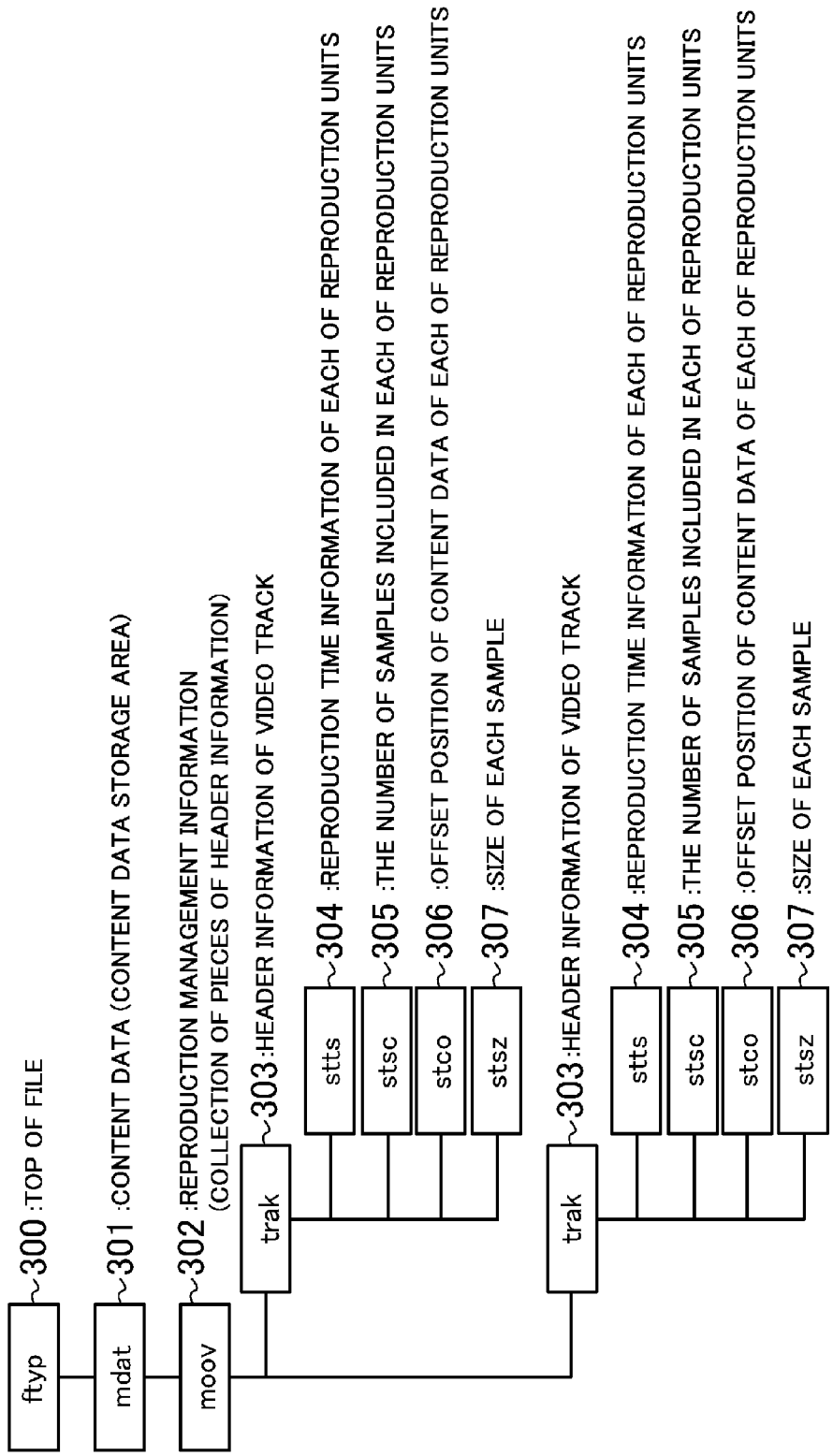
FIG. 3 is a view illustrating an example configuration of plain-text data according to the first embodiment.

FIG. 3 is a view illustrating an example configuration of the plain-text data. An ftyp box 300 is the top of a file included in the plain-test data. The plain-text data includes content data contained in an mdat box 301, and reproduction management information contained in a moov box 302. The mdat box 301 is stored in a content storage area.

A collection of pieces of header information is contained in the moov box 302, which includes trak boxes 303 containing pieces of header information of a video track, an audio track, etc. Each trak box 303 includes pieces of information about the content data, e.g., an stts box 304 containing reproduction time information of each of reproduction units, an stsc box 305 defining the number of samples included in each of the reproduction units, an stco box 306 defining the offset position of the content data of each of the reproduction unit, and an stsz box 307 specifying the size of each sample. Note that other information may be included.

In the example configuration of the plain-text data illustrated in FIG. 3, the size specified by the stsz box 307 is a minimum unit of the sample. The position of content data which will be reproduced can be computed based on the stsc box 305, the stoc box 306, and the stsz box 307. Moreover, the stts boxes 304 are used to synchronize the reproduction of the video track and the reproduction of the audio track.

Note that the moov box 302 illustrated in FIG. 3 contains reproduction management information showing a format of an mp4 (MPEG-4) file, but the moov box 302 may contain reproduction management information showing an AV format of a file other than the mp4 file. For example, a database in which format information of the plain-text data is associated with the position of the reproduction management information is used, the control data determiner 109 reads at least a part of the plain-text data, and based on the read data, the format information in the database is referenced. When the read data matches the format information, it is possible to identify the position of the reproduction management information corresponding to the format information. With this method, the plain-text data is divided into the reproduction management information and the content data, so that the plain-text data can be used in various format types. Note that in the database, instead of the position of the reproduction management information, the position of the content data may be associated with the format information, or both the position of the reproduction management information and the position of the content data may be associated with the format information.

Figure 4:
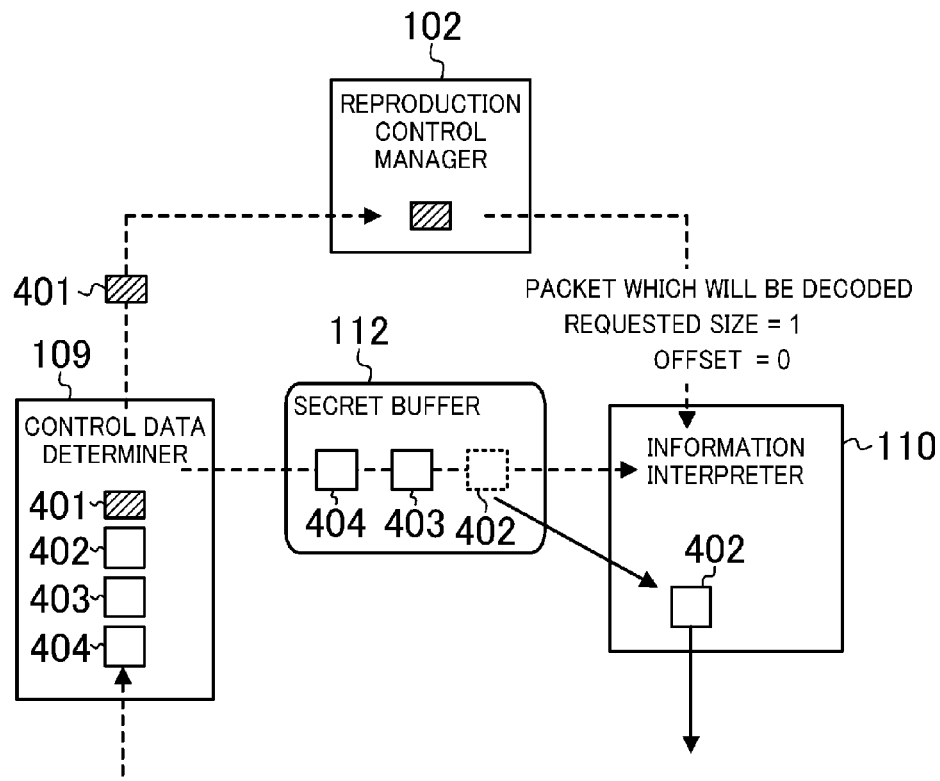
FIG. 4 is a view illustrating the flow of the plain-text data according to the first embodiment.

FIG. 4 is a view illustrating the flow of the plain-text data. The case where plain-text data is divided in the control data determiner 109 into reproduction management information 401 and a plurality of portions of content data 402-404 will be described.

The reproduction management information 401 obtained by the division in the control data determiner 109 is input to the reproduction control manager 102. On the other hand, the portions of content data 402-404 are input to the secret buffer 112.

Based on the reproduction management information 401, the reproduction control manager 102 requests the information interpreter 110 to decode one of the plurality of portions of content data. Here, the size and the offset of the one of the plurality of portions of content data which will be decoded (decode target content data) are given to the information interpreter 110. A packet which will be decoded (decode target packet) has a size equal to the size of a portion of content data (e.g., the portion of content data 402).

The information interpreter 110 handles a packet corresponding to the size given by the reproduction control manager 102 as AV decode target data. For example, when a requested size as the size of a decode target packet is equal to "1" and the offset of the packet is equal to "0," the portion of content data 402 which is located at the top in the secret buffer 112 among the portions of content data 402-404 stored in the secret buffer 112 is decoded.

Figure 5:
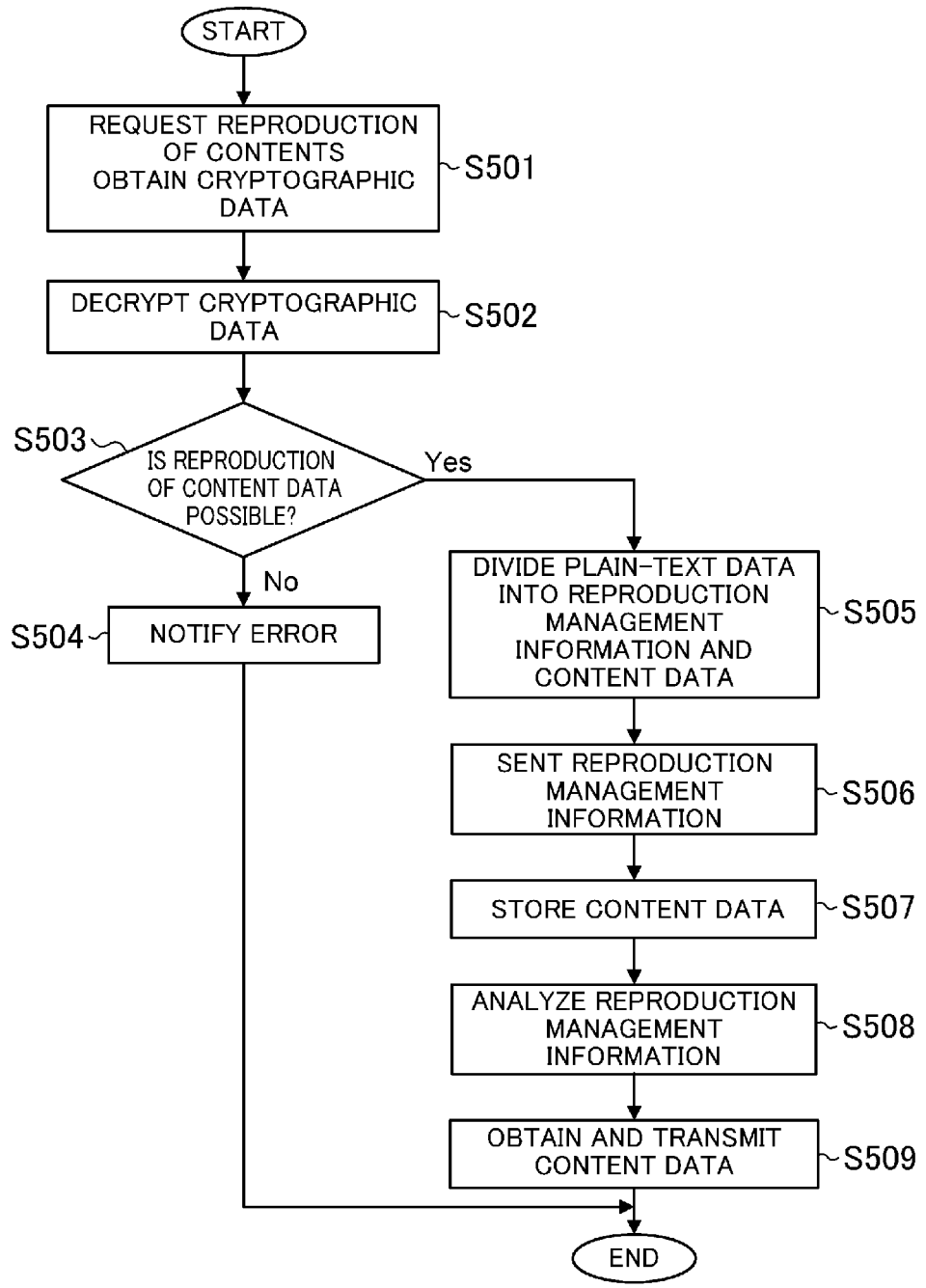
FIG. 5 is an example of a flow chart illustrating steps until content data is reproduced in the first embodiment.

FIG. 5 is a flow chart illustrating steps until content data is reproduced. As an example, a process in the case where the application 101 requests reproduction of contents will be described. Note that the storage medium 121 includes a normal area in which a mutual authentication mechanism related to data transfer between the storage medium 121 and the media controller 113 is not required, and an authentication area in which the mutual authentication mechanism is required.

The application 101 requests reproduction of contents of the cryptographic data 115 stored in the storage medium 121, which invokes control software in the order of the reproduction control manager 102, the control library 103, the file system 106, and the driver 107, thereby obtaining the cryptographic data 115 from the normal area of the storage medium 121 (S501).

The media controller 113 and the storage medium 121 are mutually authenticated using the control library 103 and the secure control module 108 to acquire a key of the cryptographic data 115 obtained in S501. Then, the key is set in a compound engine in the media controller 113. Thereafter, the cryptographic data 115 is decrypted, so that plain-text data 116 is input to the control data determiner 109 (S502).

Moreover, the control data determiner 109 determines whether or not the plain-text data 116 is a file which can be reproduced in the AV buffer (S503). When the plain-text data 116 is a file which can be reproduced in the AV buffer (Yes in S503), the plain-text data 116 is divided into the content data 117 and the reproduction management information 118 (S505). On the other hand, when the plain-text data 116 is a file which cannot be reproduced in the AV buffer (No in S503), the process is stopped, and error notification is sent back to the reproduction control manager 102 (S504).

After S505, only the reproduction management information 118 obtained by the division in S505 is transmitted to the reproduction control manager 102 which is in a user space (S506). On the other hand, the content data 117 is stored in the secret buffer 112 which is in a kernel space and is inaccessible by applications in the user space (S507). Note that the order of S506 and S507 may be exchanged.

The reproduction control manager 102 analyzes pieces of header information included in the reproduction management information 118, and via the video image reproducing library 104, the reproduction control manager 102 requests the AV decoder 114 to reproduce the content data 117 (S508). The reproduction request via the video image reproducing library 104 is received by the information interpreter 110. Then, based on the pieces of the header information designated by reference numbers 303-307 in FIG. 3, the reproduction size, the reproduction unit, and the number of samples of the content data 117 are obtained. Based on the obtained information, the position of the content data 117 is identified. Then, the content data 117 is obtained from the secret buffer 112, and the obtained content data 117 is transmitted to the AV decoder 114. Then, the content data 117 decoded in the AV decoder 114 is reproduced in the reproducing device 123 (S509).

As described above, according to the present embodiment, content data is stored in a memory in the kernel space, so that it is possible to prevent direct access to the content data from applications in the user space. That is, the confidentiality of the cryptographic data can be kept at a high level. Moreover, the content data is not transferred to a memory in the user space, so that it is possible to reduce the volume of communication related to data transfer between the memories.

Note that the cryptographic data 115 may be obtained not from the storage medium 121 but from a network.

Second Embodiment

Figure 6:
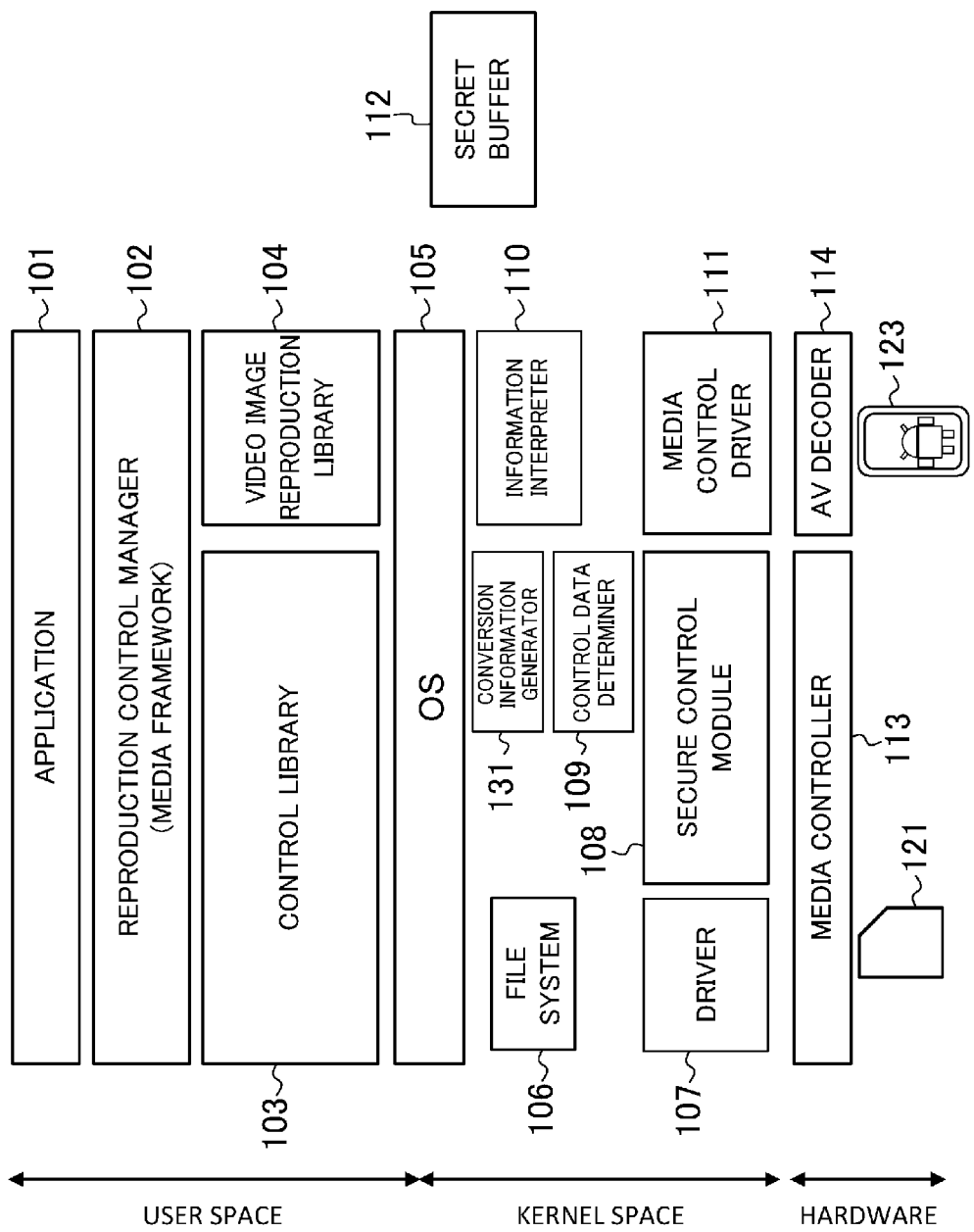
FIG. 6 is a block diagram illustrating a configuration of a content reproducing system according to a second embodiment.

FIG. 6 is a block diagram illustrating a configuration of a content reproducing system according to a second embodiment. Note that common reference numbers used in FIGS. 1 and 6 designate elements having substantially the same functions, and detailed description thereof is omitted. The configuration in FIG. 6 is different from the configuration in FIG. 1 in that a conversion information generator 131 is provided.

Figure 7:
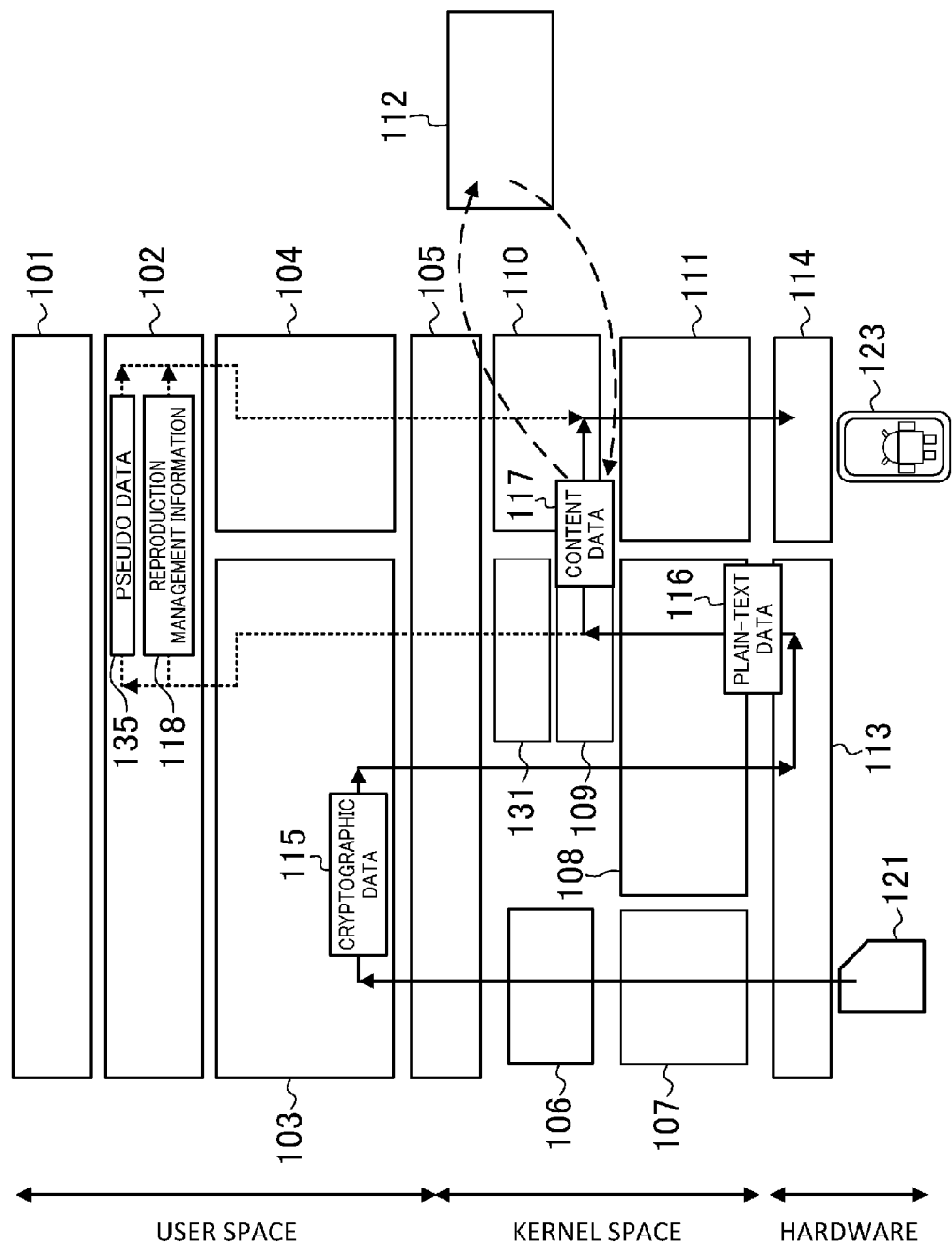
FIG. 7 is a view illustrating the data flow in the content reproducing system according to the second embodiment.

FIG. 7 is a view illustrating the data flow according to the present embodiment. Note that common reference numbers are used in FIGS. 6 and 7 to designate elements having substantially the same functions.

The conversion information generator 131 generates pseudo data 135 from content data 117. The pseudo data 135 and reproduction management information 118 are sent to a reproduction control manager 102. In this way, the reproduction control manager 102 can handle data composed of the pseudo data 135 and the reproduction management information 118 as plain-text data 116, so that in the present embodiment, it is no longer necessary to change software in the reproduction control manager 102.

Figure 8:
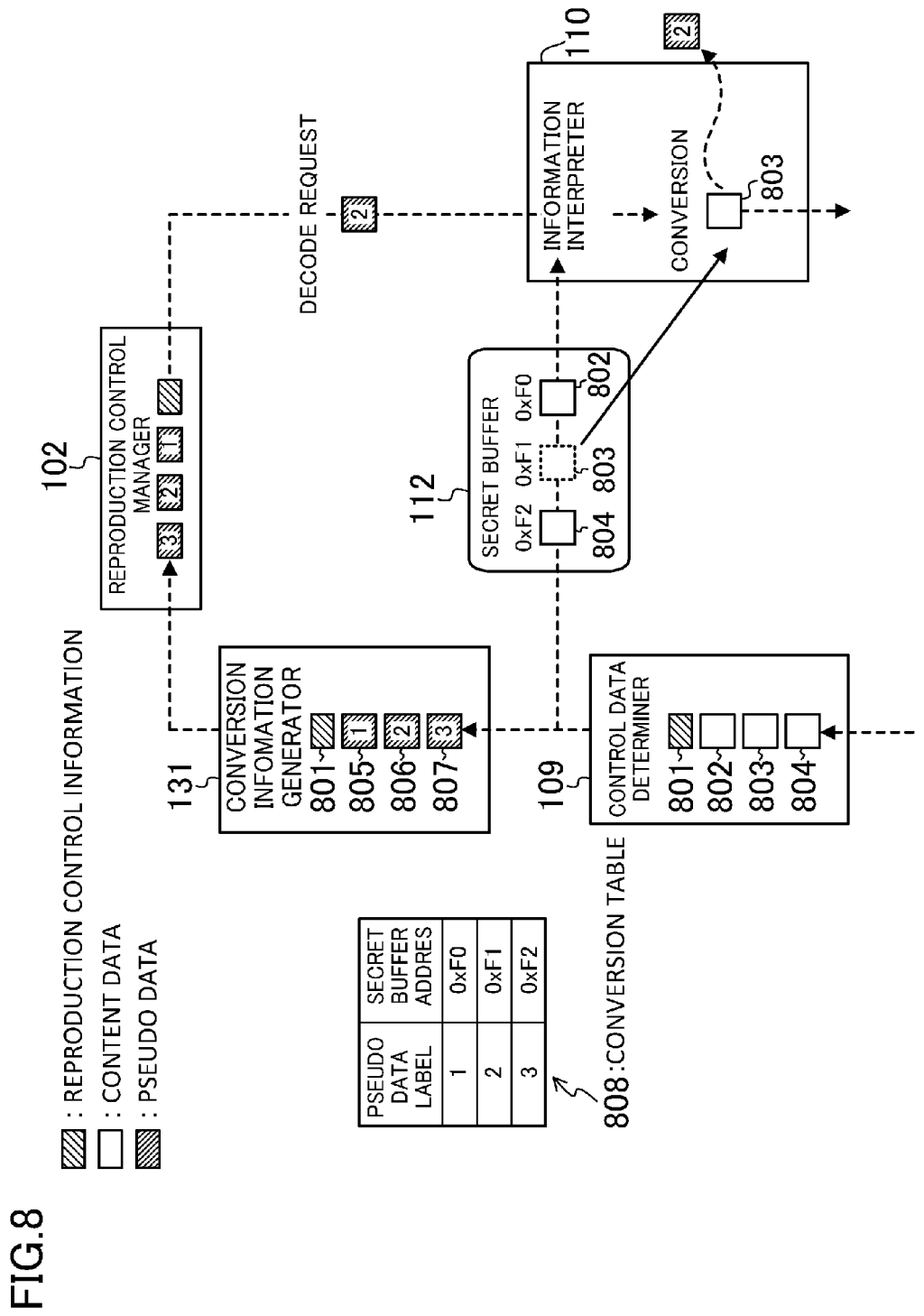
FIG. 8 is a view illustrating the flow of the plain-text data according to the second embodiment.

FIG. 8 is a view illustrating the flow of the content data and the pseudo data. First, in a control data determiner 109, plain-text data is divided into reproduction management information 801 and a plurality of portions of content data 802-804. The portions of content data 802-804 are stored in a secret buffer 112. For example, the portions of content data 802, 803, and 804 are respectively stored in addresses 0xF0, 0xF1, and 0xF2 of the secret buffer 112.

The conversion information generator 131 generates a plurality of portions of pseudo data 805-807 from the portions of content data 802-804. Moreover, the conversion information generator 131 associates the addresses of the secret buffer 112 with data labels which will be assigned to the portions of pseudo data 805-807, and registers the addresses of the secret buffer 112 and the data labels in a conversion table 808. These data labels are used to uniquely identify the portions of pseudo data 805-807. For example, the address 0xF0 and value "1" of a data label are associated with each other and are registered in the conversion table 808. Data labels registered in the conversion table 808 are assigned to the portions of pseudo data 805-807. For example, value "1" of the data label is assigned to the portion of pseudo data 805. In this way, the portions of content data 802-804 correspond one-to-one with the portions of pseudo data 805-807. The reproduction management information 801 and the portions of pseudo data 805-807 are input to the reproduction control manager 102.

Based on the reproduction management information 801, the reproduction control manager 102 requests an information interpreter 110 to decode one of the plurality of portions of content data. For example, the case where a portion of pseudo data to which value "2" of a data label is assigned is specified as decode target content data will be described.

When the information interpreter 110 receives a portion of pseudo data to which value "2" of a data label is assigned, the information interpreter 110 references the conversion table 808 based on the value, and converts the portion of pseudo data to a portion of content data. Specifically, since the value of the data label is "2," the secret buffer address 0xF1 in the conversion table 808 is referenced. Then, the portion of pseudo data 806 whose value of the label is "2" is replaced with the portion of content data 803 stored in the address 0xF1. That is, the portion of content data 803, which is reproduction target data, is identified by the portion of pseudo data 806 instead of the pieces of header information included in the reproduction management information. Thereafter, the portion of content data 803 is output to the AV decoder 114, in which the portion of content data 803 is decoded, and then the decoded portion of content data 803 is reproduced by the reproducing device 123.

As such, when the buffer addresses of the secret buffer 112 storing the portions of content data 802-804 are linked to the data labels put on the portions of pseudo data 805-807, the portions of content data 802-804 can be identified by the portions of pseudo data 805-807.

Note that instead of assigning the data labels to the portions of pseudo data, each portion of pseudo data which has a size equal to the size of a corresponding one of the portions of content data may be generated. In this case, the information interpreter 110 may obtain a portion of content data which has a size equal to the size of a corresponding one of the portions of pseudo data from the secret buffer 112. Moreover, a search for a portion of content data having a size equal to the size of a corresponding one of the portions of pseudo data in the portions of content data stored in the secret buffer 112 may be started from, for example, the top of the secret buffer 112. Alternatively, the search may be started from the end of the secret buffer 112. Alternatively, each portion of pseudo data may be formed to have a size equal to the size of a corresponding one of the portions of content data, and data labels may be assigned to the portions of pseudo data. That is, each portion of content data may be identified by a corresponding one of the portions of pseudo data.

Figure 9:
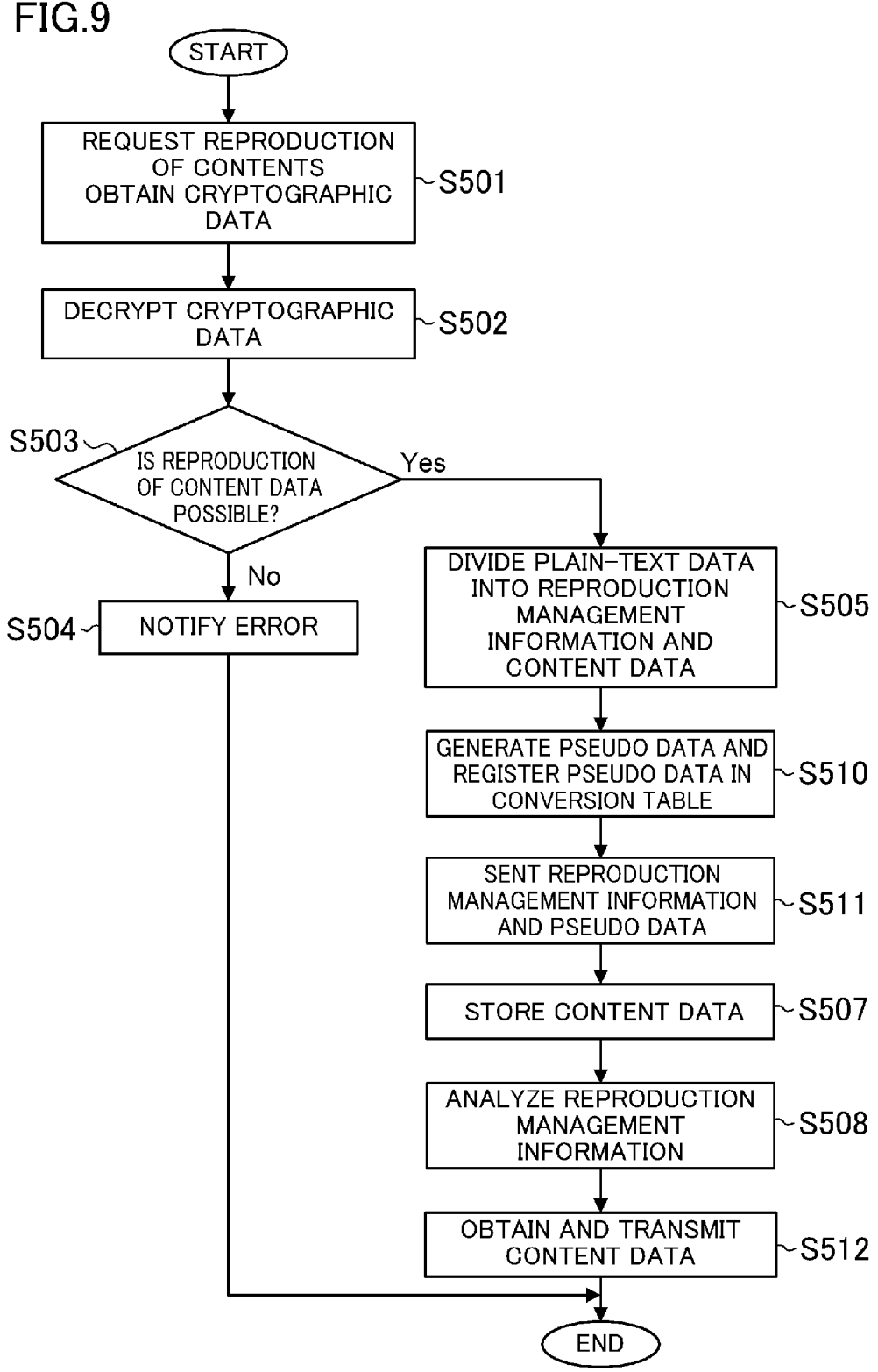
FIG. 9 is an example of a flow chart illustrating steps until content data is reproduced in the second embodiment.

FIG. 9 is a flow chart illustrating steps until content data is reproduced in the configuration illustrated in FIG. 7. Note that common reference numbers used in FIGS. 5 and 9 designate substantially the same processes, and thus detailed description thereof is omitted.

In S505, the plain-text data 116 is divided into the content data 117 and the reproduction management information 118, and then the conversion information generator 131 generates the pseudo data 135 which has, for example, a size equal to the size of the content data 117. Moreover, a data label put on the pseudo data 135 and an address of the secret buffer 112 are associated with each other and registered in the conversion table 808 (see FIG. 8) (S510). Here, the pseudo data 135 may have any contents, but when the pseudo data 135 includes a plurality of portions of pseudo data, the portions of pseudo data have to be uniquely identifiable. Therefore, data labels are put on the portions of pseudo data, so that the portions of pseudo data 135 can be uniquely identified, and eventually, each of portions of content data 117 corresponding to an associated one of the portions of pseudo data 135 can be uniquely determined.

Thereafter, the reproduction management information 118 and the pseudo data 135 are sent from the conversion information generator 131 to the reproduction control manager 102 (S511). Note that the order of S511 and S507 may be exchanged.

In S512, based on the data label of the pseudo data 135 received by the information interpreter 110, the conversion table 808 is referenced to obtain the content data 117 which is in the address associated with the data label. Then, the pseudo data 135 is replaced with the content data 117, and the content data 117 is transmitted to the AV decoder 114.

Note that in S512, the information interpreter 110 may start a search for the content data 117 having a size equal to the size of the received pseudo data 135 from the top of the secret buffer 112.

As described above, according to the present embodiment, the pseudo data can be handled in a user space as the content data, so that it is not necessary to change software in the user space. Moreover, the pseudo data is output to the user space, so that the content data can be hidden in the kernel space. Furthermore, a mechanism to identify the pseudo data by a minimum decode unit is implemented, so that even when the order of transmission of portions of content data is different from the order of reproduction of portions of content data, the portions of content data can be reproduced in a correct order.

Third Embodiment

Figure 10:
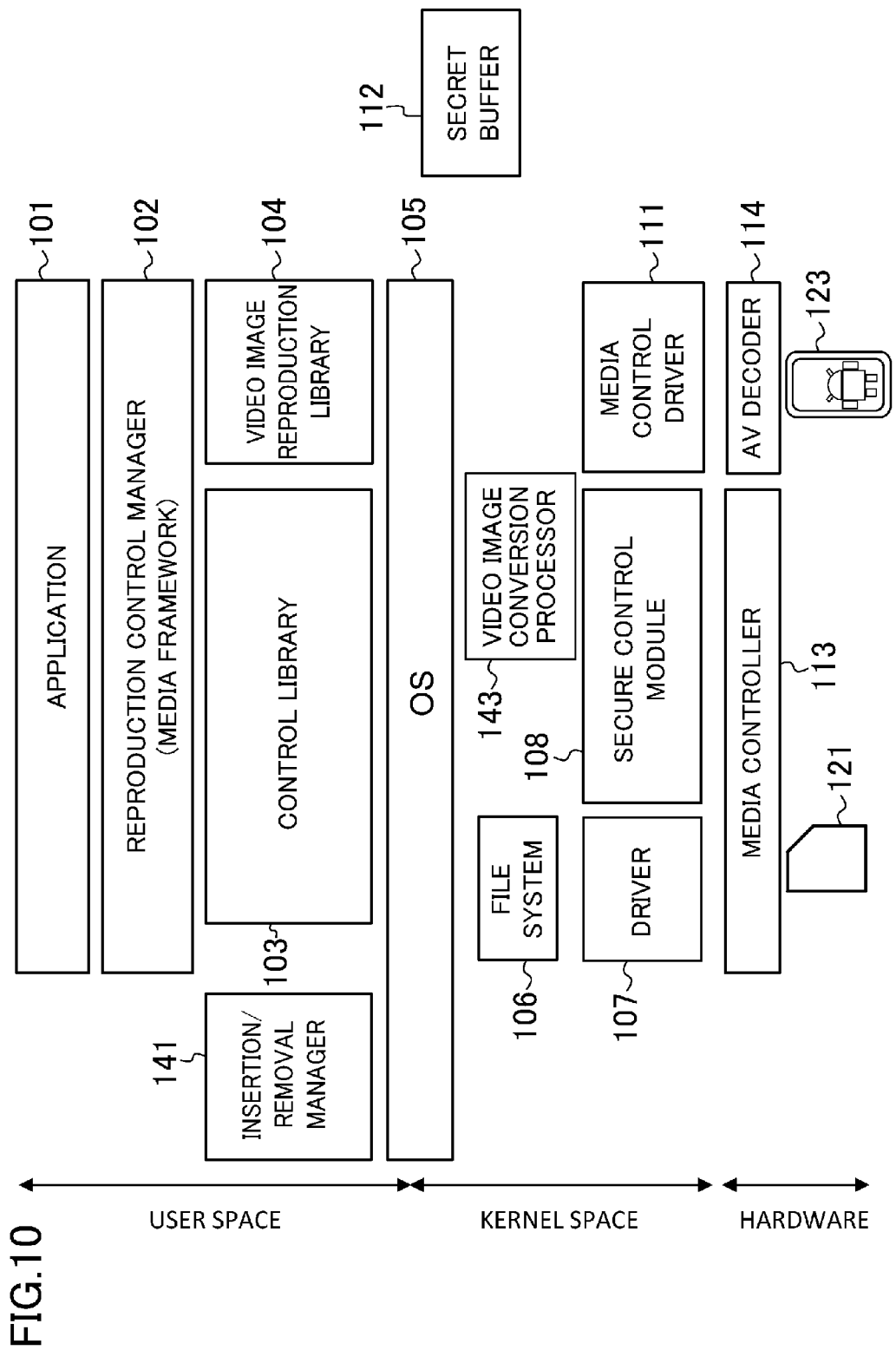
FIG. 10 is a block diagram illustrating a configuration of a thumbnail image generating system according to a third embodiment.

FIG. 10 is a block diagram illustrating a configuration of a thumbnail image generating system according to a third embodiment. Note that common reference numbers used in FIGS. 1 and 10 designate elements having substantially the same functions, and detailed description thereof is omitted. The configuration in FIG. 10 is different from the configuration of FIG. 1 in that the control data determiner 109 and the information interpreter 110 are not provided but an insertion/removal manager 141 and a video image conversion processor 143 are provided.

Figure 11:
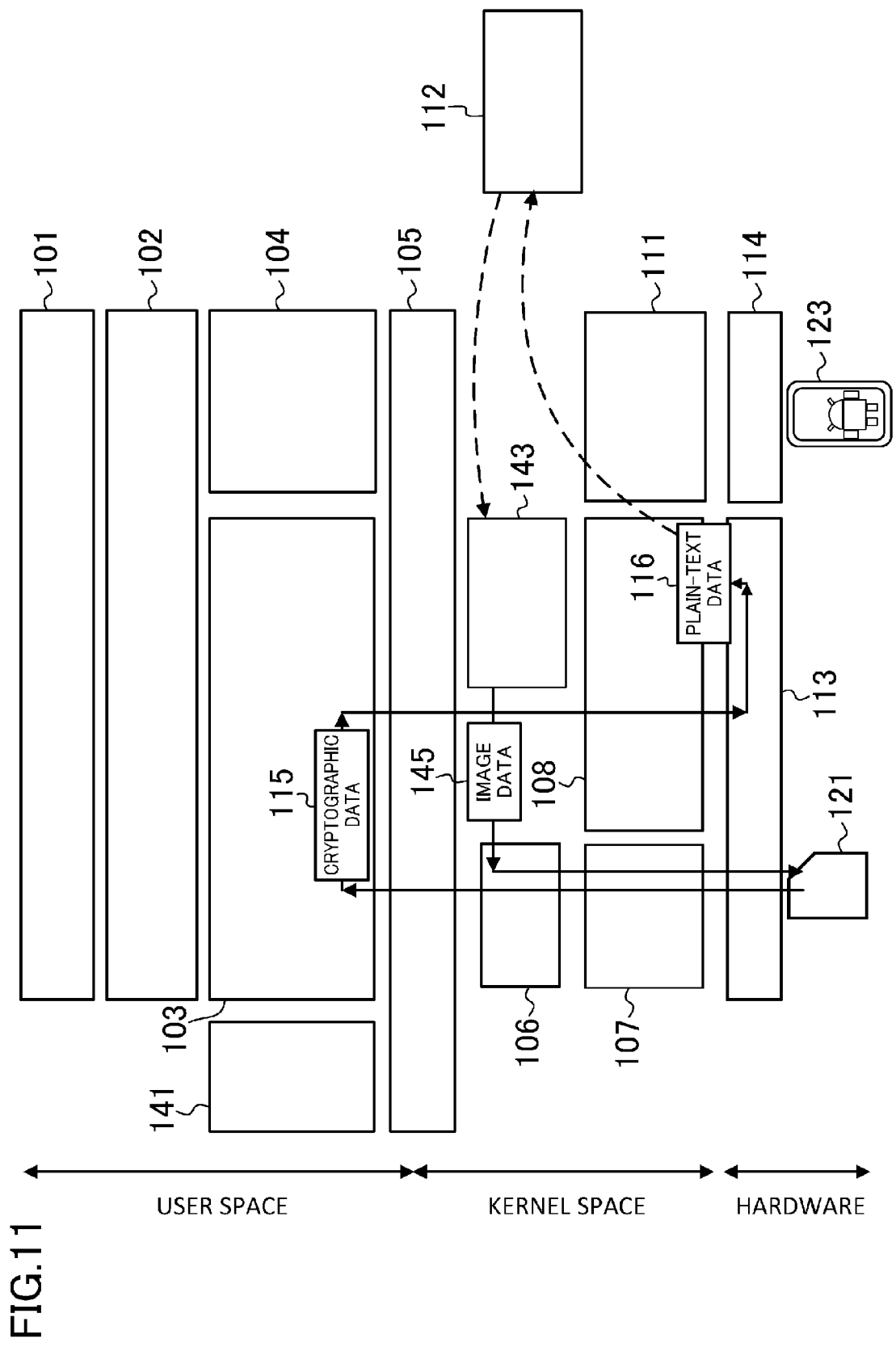
FIG. 11 is a view illustrating the data flow in the thumbnail image generating system according to the third embodiment.

FIG. 11 is a view illustrating the flow of data according to the present embodiment. Note that common reference numbers in FIGS. 10 and 11 designate elements having substantially the same functions.

The insertion/removal manager 141 is invoked from an OS 105 when a storage medium 121 is removed from or inserted into a media controller 113. When the insertion/removal manager 141 is invoked, a control library 103 operates to convert cryptographic data 115 to plain-text data 116 in the same manner as in the first embodiment. The plain-text data 116 is stored in a secret buffer 112.

The video image conversion processor 143 reads the plain-text data 116 from the secret buffer 112, extracts a part of video image data included in the plain-text data 116, and converts the extracted part to image data 145. The image data 145 is written to the storage medium 121 in a file name and a file type corresponding to those of the video image data.

Figure 12:
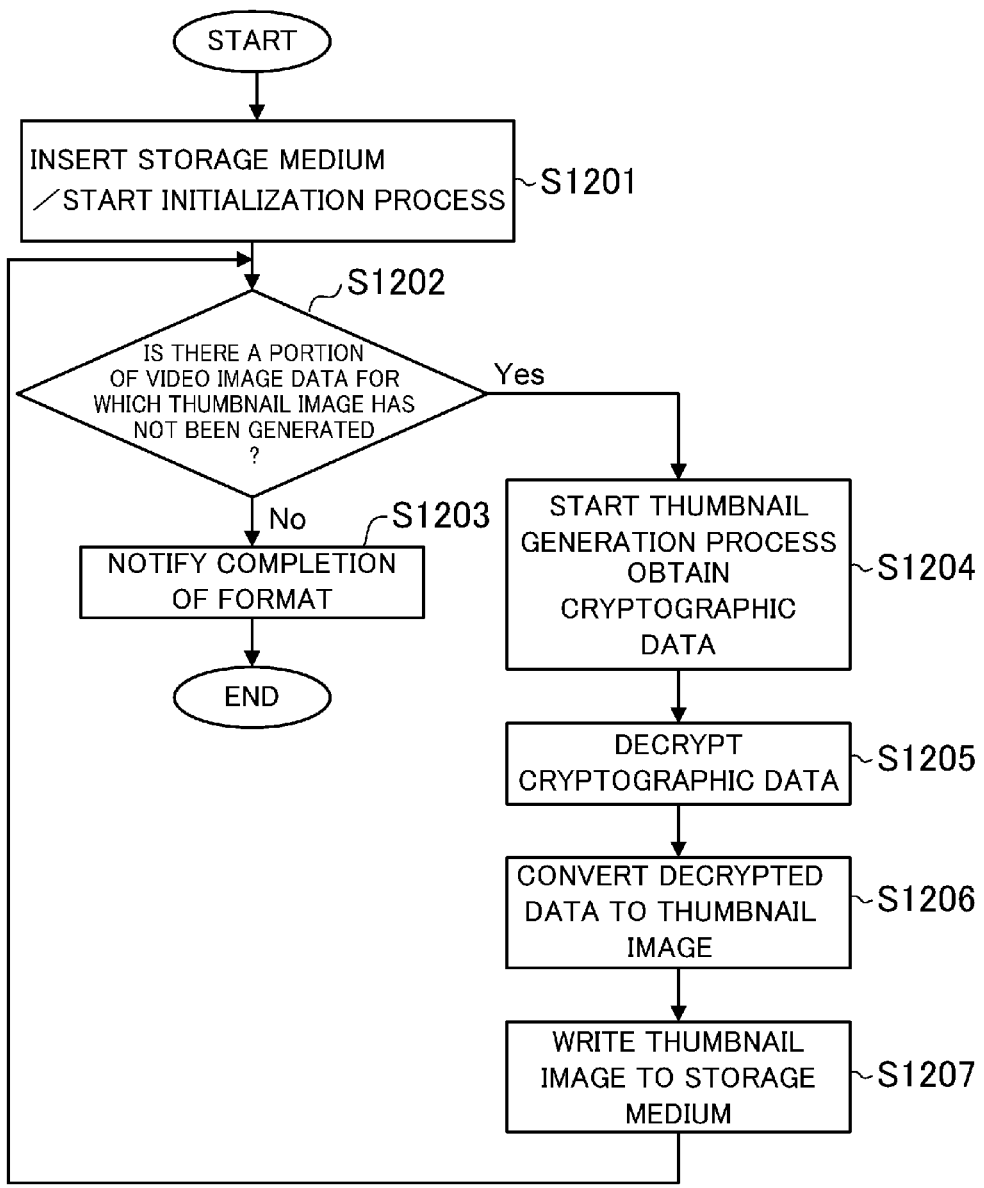
FIG. 12 is an example of a flow chart illustrating thumbnail image generation in the third embodiment.

FIG. 12 is a flow chart illustrating generation of a thumbnail image according to the present embodiment. First, when the storage medium 121 is inserted into the media controller 113, the insertion/removal manager 141 is invoked from the OS 105, thereby performing an initialization process to allow access to the storage medium 121 (S1201).

In the initialization process to allow the access to the storage medium 121, it is checked whether or not a thumbnail image has already been written to the storage medium 121 (S1202), the thumbnail image being the image data 145 included in the video image data according to the cryptographic data 115. When thumbnail images of all of a plurality of portions of video image data are in the storage medium 121 (No in S1202), thumbnail images are not generated, and completion of the initialization process is notified (S1203).

On the other hand, when a portion of video image data whose thumbnail image has not been generated is in the storage medium 121 (Yes in S1202), the insertion/removal manager 141 invokes control software in the order of a control library 103, a file system 106, and a driver 107 to obtain cryptographic data from a normal area of the storage medium 121 (S1204).

The media controller 113 and the storage medium 121 are mutually authenticated using the control library 103 and a secure control module 108, thereby acquiring a key of the cryptographic data 115 obtained in S 1204. Then, the key is set in a compound engine in the media controller 113. Thereafter, the cryptographic data 115 is decrypted, so that the plain-text data 116 is stored in a secret buffer 112 (S1205).

The video image conversion processor 143 extracts a part of the video image data included in the plain-text data 116 buffered in the secret buffer 112, and converts the extracted part to a thumbnail image (S1206). The file name of the thumbnail image generated in S 1206 is linked to the file name of the video image data, and then the thumbnail image generated in S1206 is written to the storage medium 121 via the file system 106 (S1207). Then, the process goes back to S1202, and the processes described above are repeated.

As described above, according to the present embodiment, when content data stored using one device is reproduced for the first time by the device illustrated in FIG. 12, image data can be automatically extracted to form a thumbnail image. Conventionally, a video image conversion process is performed in the reproduction control manager 102 in the user space, whereas the present embodiment includes the video image conversion processor 143 in the kernel space, so that the security level of the content data can be increased.

Note that the file name of the thumbnail image may be linked to the file name of the video image data in the storage medium 121 using a separate management file. In this case, update processing of the management file may be separately performed.

Alternatively, a thumbnail image is generated according to the present embodiment, and then the reproduction flow of the content data may be performed as described in the first and second embodiments. For example, the control data determiner 109 and the information interpreter 110 in FIG. 1 are added to the configuration in FIG. 10, and when a thumbnail image is generated, the plain-text data 116 is stored in the secret buffer 112 before the plain-text data 116 is divided. Thereafter, when the content data 117 is reproduced, the plain-text data 116 may be input to the control data determiner 109.

Examples of Application

Figure 13:
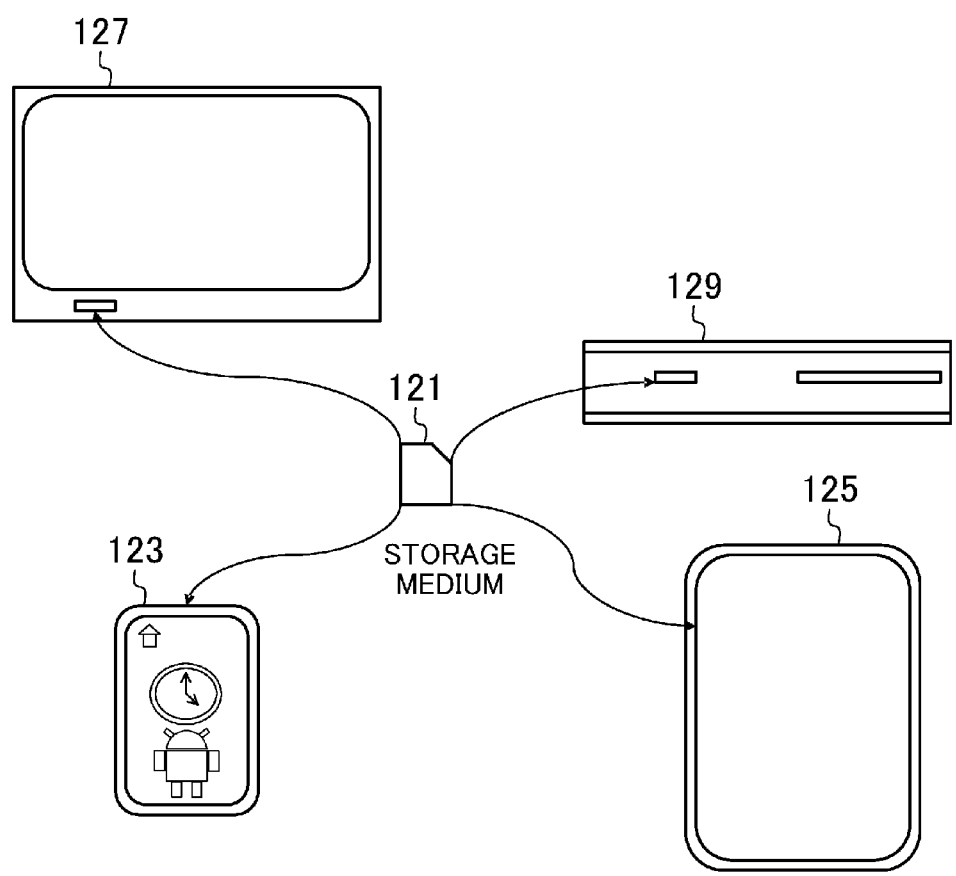
FIG. 13 is a view illustrating various electronic devices according to an example of application.

FIG. 13 is a view illustrating various electronic devices according to an example of application. In FIG. 13, the case where content data is brought out by a storage medium 121 such as a memory card among various electronic devices such as a smartphone 123, a tablet terminal 125, a television set 127, and a recorder 129 will be described.

When each of the smartphone 123, the tablet terminal 125, the television set 127, and the recorder 129 illustrated in FIG. 13 has any one of the configurations in the embodiments described above, content data which has to be protected by copyright can be securely handled among these electronic devices.

Note that each of the embodiments is implemented for, in particular, the case where AV data is reproduced in electronic devices using open platform designed for embedded system. Thus, each of the embodiments is advantageous in various electronic devices using an open platform allowing free installation of applications.

What is claimed is:

1. A method for reproducing encrypted content data, comprising:
   a decryption step of decrypting the encrypted content data to generate plain-text data;
   a division step of dividing the plain-text data generated in the decryption step into decrypted content data and reproduction management information including header information about the decrypted content data;
   a sending-to-user-space step of sending the reproduction management information obtained in the division step to a user space accessible by an application;
   a storing-in-kernel-space step of storing the decrypted content data obtained in the division step in a secret buffer in a kernel space of an operating system;
   a pseudo data generation step of generating pseudo data corresponding to the decrypted content data obtained in the division step, wherein in the sending-to-user-space step, the pseudo data generated in the pseudo data generation step is sent to the user space together with the reproduction management information obtained in the division step,
   a transmission-to-decoder step of obtaining the decrypted content data identified by the pseudo data, wherein the decrypted content data having a decrypted content data size equal to a size of the pseudo data is obtained as reproduction target data from the secret buffer, transmitting the reproduction target data to a decoder;

wherein the size of the pseudo data is equal to the decrypted content data size of the decrypted content data identified by the pseudo data; and a decode step of decoding the reproduction target data by the decoder.

2. The method of claim 1, wherein the pseudo data includes an identifier to uniquely identify the decrypted content data.

3. The method of claim 2, wherein
in the transmission-to-decoder step,
the identifier included in the pseudo data is referenced, and
the decrypted content data identified by the identifier included in the pseudo data is obtained as the reproduction target data from the secret buffer.

4. The method of claim 1, wherein in the transmission-to-decoder step, a search for the decrypted content data having the decrypted content data size equal to the size of the pseudo data is started from a top of the secret buffer.

5. The method of claim 1, wherein
the encrypted content data is input from a storage medium.

6. The method of claim 1, wherein
the encrypted content data is input from a network.

7. The method of claim 1, wherein
the secret buffer is inaccessible by software in the user space.

* * * * *